April 30, 1929.　　　F. F. FORSHEE　　　1,710,770

RANGE OVEN CONSTRUCTION

Filed May 11, 1927　　2 Sheets-Sheet 1

WITNESSES:
E. A. M'Closkey.
H. M. Biebel

INVENTOR
Frank F. Forshee.
BY
Wesley E. Carr
ATTORNEY

April 30, 1929.  F. F. FORSHEE  1,710,770
RANGE OVEN CONSTRUCTION
Filed May 11, 1927  2 Sheets-Sheet 2
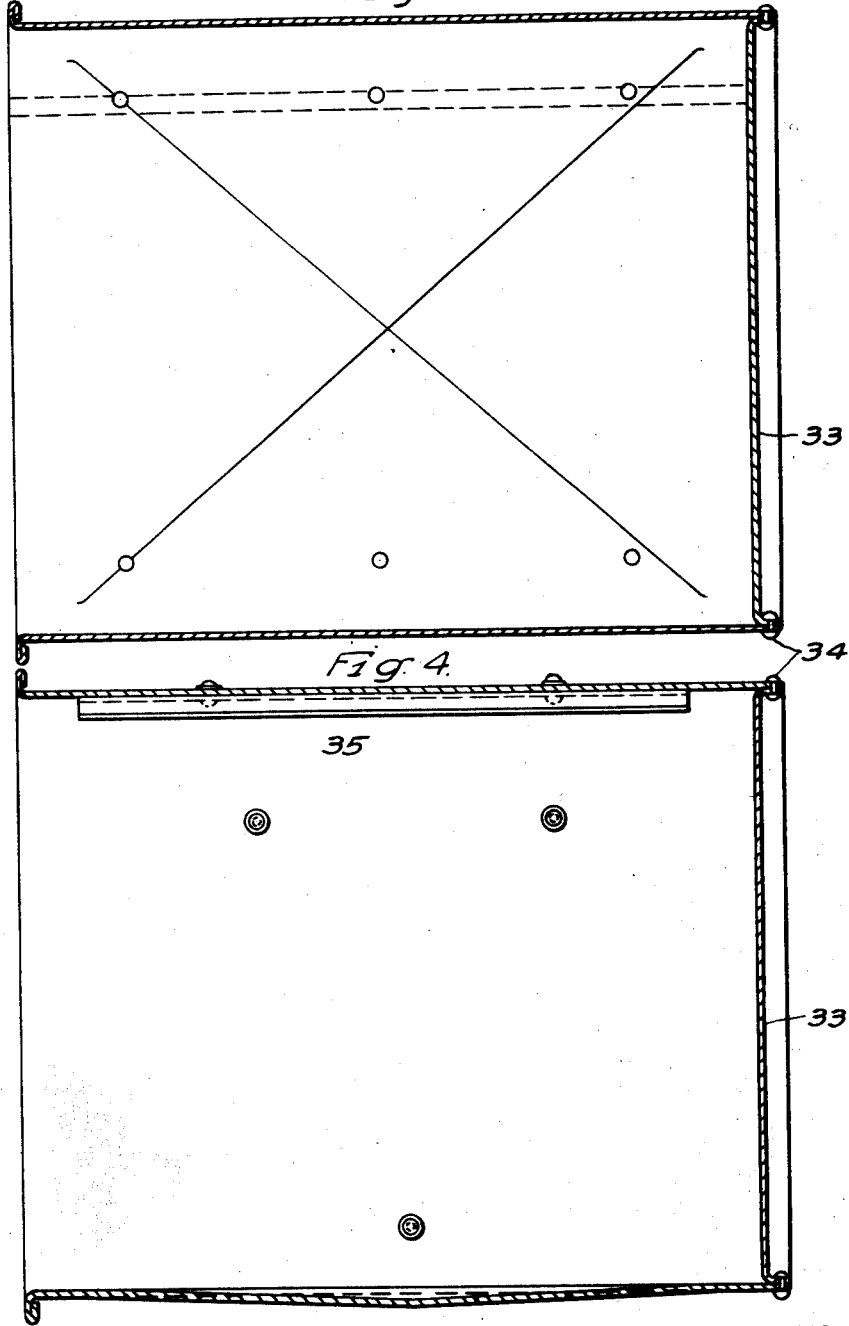

Patented Apr. 30, 1929.

1,710,770

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

RANGE-OVEN CONSTRUCTION.

Application filed May 11, 1927. Serial No. 190,453.

My invention relates to electric ranges and particularly to oven casings for such ranges.

An object of my invention is to provide an oven casing having an enameled inner surface and made of relatively thin sheet metal, that shall embody means for preventing burning and cracking of the enamel adjacent to a heating unit.

In practicing my invention, I provide an oven casing of relatively thin sheet metal, the inner surface of which is enameled, that wall of the casing which is located adjacent to a heating unit, being provided with an initial bulge away from the heating unit.

In the drawings,

Fig. 3 is a view, in horizontal section therethrough, taken on the line III—III of Fig. 2, and Fig. 4 is a view, in vertical section therethrough, taken on the line IV—IV of Fig. 2.

Figure 1:
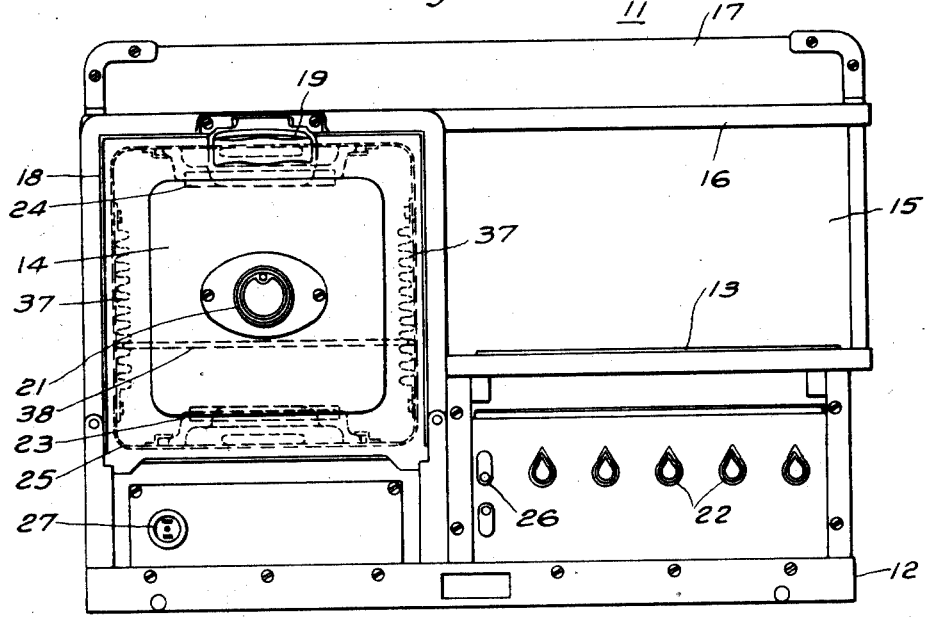
Figure 1 is a view, in front elevation, of a range, with which is associated the device embodying my invention.

An electric range 11 comprises a bottom frame illustrated generally by a member 12, upon which is mounted a stove portion 13 and an oven portion 14. A back member 15 is located above the stove portion, a shelf 16 being provided at substantially the same height as the top of the oven structure, while a finishing member 17 is provided at the top of the assembled unit extending across the oven and the stove portions respectively.

No supporting legs are shown, although these are used, and as the general construction of the range forms no part of my invention, it is not further referred to in detail.

The oven structure 14 is provided with a front door 18 having hinges secured thereto at the lower portion thereof and being provided with a handle 19 at the upper part thereof to permit of latching and of opening and closing the door. A thermostat 21 is mounted at the front of the oven door to permit of either reading the temperature within the oven or of cooperating with suitable means, not shown in detail, for controlling the temperature within the oven in a manner well known in the art.

Switch knobs 22 are shown as located beneath the stove portion to permit of manually controlling a plurality of heating units mounted in the stove portion and not shown in detail, as well as for controlling the energization of a lower heating unit 23 and an upper heating unit 24 located within the oven and more particularly within a sheet metal oven casing designated by the numeral 25 and to be described hereinafter in detail. An electromagnetic circuit breaker is also mounted beneath the stove portion of which only the operating and actuating handles 26 are shown, with which the thermostat or thermal relay 21 may cooperate in a manner well known in the art to control the oven temperature. A socket 27 is supported below the oven structure to permit of connecting thereto a small electric cooking appliance, such as a percolator, which may be located on the stove during the percolating operation.

Figure 2:
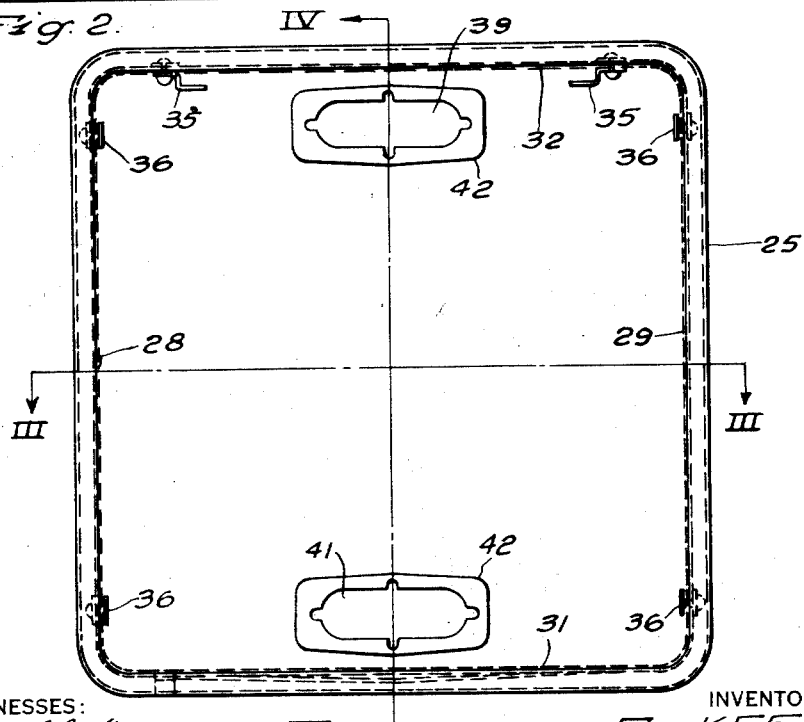
Fig. 2 is a view, in front elevation, of an oven casing embodying my invention.

The oven casing 25 comprises a single sheet of relatively thin metal which is bent to substantially rectangular form to constitute the two side walls 28 and 29, a bottom wall 31 and a top wall 32. (See Fig. 2.) A suitable joint, not shown specifically in the drawings, is used to secure the two adjacent ends together. A rear wall 33 of relatively thin sheet metal is also provided, this wall being of dished shape as is shown in Figs. 3 and 4 of the drawing, and which may be secured to the rear edge of the folded walls 28 to 31, inclusive, either by rivets 34, as shown in Figs. 3 and 4 of the drawing, or by being spot-welded thereto.

The front edge of each of the walls of the oven casing are bent over in a manner best shown in Figs. 3 and 4, in order to provide a relatively stiff casing structure.

The top wall 32 is provided with a plurality of supporting members 35, each of substantially Z-shape, one end portion being riveted to the wall and the other end portion being spaced away therefrom to receive and support the upper heating unit 24.

The side walls 28 and 29 are provided with rivets 36 having relatively large inner heads which are adapted to receive glide members 37 which are shown more particularly in Fig. 1 of the drawings. These glide members are formed by suitably bending a single sheet of metal and providing it with suitable openings to permit of its being hooked over the rivets 36. A removable shelf 38 operatively engages the recesses in the glide members 37 in a manner well known in the art.

An upper opening 39 and a lower opening 41 are provided in the rear wall 33, and are respectively provided with a re-enforcing member 42 to permit of locating therein a contact socket structure, not shown in the drawings, to permit of energizing the heating units 23 and 24 when they are moved into the proper operative positions within the oven casing, substantially as shown in Fig. 1 of the drawings.

The bottom wall 31 of the oven casing is provided with an initial downward dish or outward bulge, shown more particularly in Fig. 4 of the drawing. This dish or bulge is made of rectangular form to conform more particularly to the rectangular contour of the wall 31. The entire inner surface of the walls 28 to 32, inclusive, are enameled.

In oven casings as made heretofore without this initial dish or bulge, I have found that movement of the wall caused by its expansion when heated during operation, was just as likely to cause the central portion of the wall to move upwardly as it was to move it downwardly. In other words, I believe that the wall 31 was never without any dish or bulge, and such dish or bulge caused by the manufacturing operations was just as likely to be upwardly as downwardly. If it was upwardly, the bulge would increase upon heating and the enameled surface of the central portion of the wall would move closer to the heating unit 23, causing burning and cracking of the enamel.

By providing a pronounced initial outward bulge, any movement will be away from the other walls and more particularly the central portion will move away from the heating unit, thereby reducing the temperature rise of the central portion and reducing the stress upon the coating of enamel as well as reducing its temperature.

I have found that the use of an oven casing having an internal enameled surface, in which a wall adjacent to a heating unit is provided with an initial outward bulge, effectively prevents cracking and chipping of the enamel on that wall.

Various modifications may be made in the device embodying my invention without departing from the spirit and scope thereof, and I desire that only such limitations shall be placed thereon as are imposed by the prior art or are set forth in the appended claims.

I claim as my invention:

1. In an electric range, in combination, an oven casing comprising a plurality of sheet metal walls, a coating of enamel thereon on the inner surfaces of said walls, and a heating unit supported by one of said walls adjacent to the inner surface thereof, said wall supporting the heating unit being provided with an initial outward paneled dish to cause it to expand outwardly away from the heating unit when heated, thereby reducing the temperature rise of the enamel and tending to prevent cracking thereof.

2. In an electric range, in combination, a plurality of metal walls cooperating to constitute an oven casing, a coating of enamel on one surface of said walls, and a heating unit supported by, and adjacent to, the enameled surface of one of said walls, said supporting wall being initially dished away from the heating unit, whereby the central portion thereof moves away from the heating unit when heated, thereby reducing its temperature rise and the stress upon the coating of enamel thereon.

3. In an electric range, in combination, a plurality of walls cooperating to constitute an oven casing of substantially rectangular shape, a coating of enamel on the inner surface of a rectangular wall, and a heating means located in said casing adjacent to said enameled wall surface, said enameled wall being provided with an initial outward dish of rectangular shape to conform to the contour of the casing, whereby expansion of the enameled wall, when heated, tends to increase the distance between the heating unit and the said enameled wall surface to reduce the temperature rise of, and the stress on, the enamel surface.

In testimony whereof, I have hereunto subscribed my name this 29th day of April 1927.

FRANK F. FORSHEE.